United States Patent
Chae et al.

(10) Patent No.: US 9,918,181 B2
(45) Date of Patent: Mar. 13, 2018

(54) SYNCHRONIZATION METHOD AND SYNCHRONIZATION APPARATUS FOR D2D COMMUNICATION IN WIRELESS COMMUNICATION SYSTEM

(71) Applicant: LG ELECTRONICS INC., Seoul (KR)

(72) Inventors: Hyukjin Chae, Anyang-si (KR); Inkwon Seo, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 404 days.

(21) Appl. No.: 14/406,413

(22) PCT Filed: Jun. 26, 2013

(86) PCT No.: PCT/KR2013/005638
§ 371 (c)(1),
(2) Date: Dec. 8, 2014

(87) PCT Pub. No.: WO2014/003430
PCT Pub. Date: Jan. 3, 2014

(65) Prior Publication Data
US 2015/0181366 A1 Jun. 25, 2015

Related U.S. Application Data

(60) Provisional application No. 61/664,693, filed on Jun. 26, 2012.

(51) Int. Cl.
*H04W 4/00* (2009.01)
*H04W 56/00* (2009.01)
*H04W 72/04* (2009.01)

(52) U.S. Cl.
CPC ......... *H04W 4/005* (2013.01); *H04W 56/001* (2013.01); *H04W 56/004* (2013.01);
(Continued)

(58) Field of Classification Search
CPC . H04W 4/005; H04W 56/001; H04W 56/004; H04W 56/0025; H04W 72/0446; H04W 72/048
See application file for complete search history.

(56) References Cited

U.S. PATENT DOCUMENTS 7,336,638 B2 * 2/2008 Cheng ............... H04W 56/0045
370/278
2002/0129169 A1 9/2002 Tanaka et al.
(Continued)

FOREIGN PATENT DOCUMENTS

CN 1792048 A 6/2006
CN 102165840 A 8/2011
(Continued)

*Primary Examiner* — Hassan Kizou
*Assistant Examiner* — Ashil Farahmand
(74) *Attorney, Agent, or Firm* — Birch, Stewart, Kolasch & Birch, LLP

(57) ABSTRACT

The present invention relates to a method for achieving synchronization for the device-to-device (D2D) communication of a first terminal in a wireless communication system, comprising the steps of: calculating a time advance of a second terminal using the information relating to the transmission timing of a second transmission point, the downlink transmission timing of a first transmission point, timing the receipt of a downlink signal from the second transmission point; and receiving a signal from the second terminal using the timing advance of the second terminal.

6 Claims, 9 Drawing Sheets

(52) U.S. Cl.
CPC ..... *H04W 56/0025* (2013.01); *H04W 72/048* (2013.01); *H04W 72/0446* (2013.01)

(56) References Cited

U.S. PATENT DOCUMENTS

| | | |
|---|---|---|
| 2006/0166688 A1 | 7/2006 | Sun et al. |
| 2009/0017851 A1 | 1/2009 | Li et al. |
| 2011/0065378 A1 | 3/2011 | Watanabe |
| 2011/0182280 A1* | 7/2011 | Charbit ............. H04W 56/0045 370/350 |
| 2012/0096186 A1 | 4/2012 | Chang et al. |

FOREIGN PATENT DOCUMENTS

| | | |
|---|---|---|
| JP | 2011-66654 A | 3/2011 |
| KR | 2002-0072188 A | 9/2002 |
| KR | 10-2010-0038441 A | 4/2010 |
| WO | WO 2005/053347 A1 | 6/2005 |
| WO | WO 2008/045315 A1 | 4/2008 |

* cited by examiner

SYNCHRONIZATION METHOD AND SYNCHRONIZATION APPARATUS FOR D2D COMMUNICATION IN WIRELESS COMMUNICATION SYSTEM

CROSS REFERENCE TO RELATED APPLICATIONS

This application is the National Phase of PCT International Application No. PCT/KR2013/005638, filed on Jun. 26, 2013, which claims priority under 35 U.S.C. 119(e) to U.S. Provisional Application No. 61/664,693, filed on Jun. 26, 2012, all of which are hereby expressly incorporated by reference into the present application.

TECHNICAL FIELD

The present invention relates to a wireless access system, and more particularly, to a method and apparatus for acquiring synchronization for D2D communication.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

Device to device (D2D) communication refers to a communication scheme that a direct link is configured between user equipments (UEs) to allow the UEs to directly transmit and receive voice and data to and from each other without through a base station (evolved NodeB; eNB). D2D communication may include user equipment-to-user equipment (UE-to-UE) communication, peer-to-peer communication, etc. Also, the D2D communication scheme may be applied to machine-to-machine (M2M) communication, machine type communication (MTC), etc.

D2D communication is considered as a solution for solving load of a base station, which is caused by data traffic which is rapidly increased. For example, according to D2D communication, since data are transmitted and received between devices without a base station unlike the conventional wireless communication system, overload of a network may be reduced. Also, with the introduction of D2D communication, advantages of process reduction of the base station, power consumption reduction of devices which join in D2D communication, increase of data transmission rate, increase of network capacity, load distribution, cell coverage enlargement, etc. may be expected.

DISCLOSURE

Technical Problem

An object of the present invention devised to solve the conventional problem is to provide a method and apparatus for acquiring synchronization for D2D communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a first technical aspect of the present invention, a method for acquiring synchronization for the device-to-device (D2D) communication of a first user equipment in a wireless communication system comprises the steps of calculating a time advance $TA_2$ of a second user equipment by using information $\delta$ related to transmission timing of a second transmission point, downlink transmission timing $$t_1 - \frac{TA_1}{2}$$

of a first transmission point, and downlink signal reception timing $t_2$ from the second transmission point; and receiving a signal from the second user equipment by using the timing advance of the second user equipment.

The first technical aspect may include the following matters.

The step of calculating the timing advance $TA_2$ of the second user equipment may comprise the steps of calculating downlink transmission timing $$\left(t_1 - \frac{TA_1}{2}\right) + \delta$$

of the second transmission point from the downlink transmission timing $$t_1 - \frac{TA_1}{2}$$

of the first transmission point and the information $\delta$ related to the transmission timing of the second transmission point; and calculating the timing advance $$2\left(t_2 - \left(\left(t_1 - \frac{TA_1}{2}\right) + \delta\right)\right)$$

of the second user equipment from the downlink signal reception timing $t_2$ from the second transmission point and the downlink transmission timing $$\left(t_1 - \frac{TA_1}{2}\right) + \delta$$

of the second transmission point.

The downlink transmission timing $$t_1 - \frac{TA_1}{2}$$

of the first transmission point is calculated from downlink signal reception timing $t_1$ of the first transmission point and a timing advance $TA_1$ of the first user equipment.

The timing advance of the second user equipment is expressed by the following Equation:

$$TA_2 = 2\left(t_2 - \left(\left(t_1 - \frac{TA_1}{2}\right) + \delta\right)\right),$$

where $TA_2$ means the timing advance of the second user equipment, $t_1$ means the downlink signal reception timing from the first transmission point, $t_2$ means the downlink signal reception timing from the second transmission point, $TA_1$ means the timing advance of the first user equipment, and $\delta$ means the information related to the transmission timing of the second transmission point.

The method may further comprise the step of receiving the information $\delta$ related to the transmission timing of the second transmission point from the first transmission point.

The information related to the transmission timing of the second transmission point may be a value estimated by the user equipment.

The information related to the transmission timing of the second transmission point may be a difference value between the downlink transmission timing of the first transmission point and the downlink transmission timing of the second transmission point.

The downlink signal reception timing $t_1$ from the first transmission point and the downlink signal reception timing $t_2$ from the second transmission point may respectively be determined from synchronization signals from the first transmission point and the second transmission point.

The first user equipment may regard the timing advance of the second user equipment as its timing advance for the second transmission point.

In a second technical aspect of the present invention, a method for acquiring synchronization for the device-to-device (D2D) communication of a first user equipment in a wireless communication system comprises the steps of overhearing an uplink reference signal of a second user equipment; determining subframe boundary of the second user equipment from the uplink reference signal; and receiving a signal from the second user equipment by using the subframe boundary of the second user equipment.

The uplink reference signal may be a sounding reference signal (SRS).

The first user equipment may forward a time interval for overhearing the uplink reference signal to a base station.

The base station may regard that there is no uplink transmission from the first user equipment for the time interval.

The method may further comprise the step of receiving information related to the uplink reference signal from the base station.

Advantageous Effects

According to the present invention, uplink synchronization of a user equipment which desires to perform D2D communication may be acquired efficiently.

It will be appreciated by persons skilled in the art that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
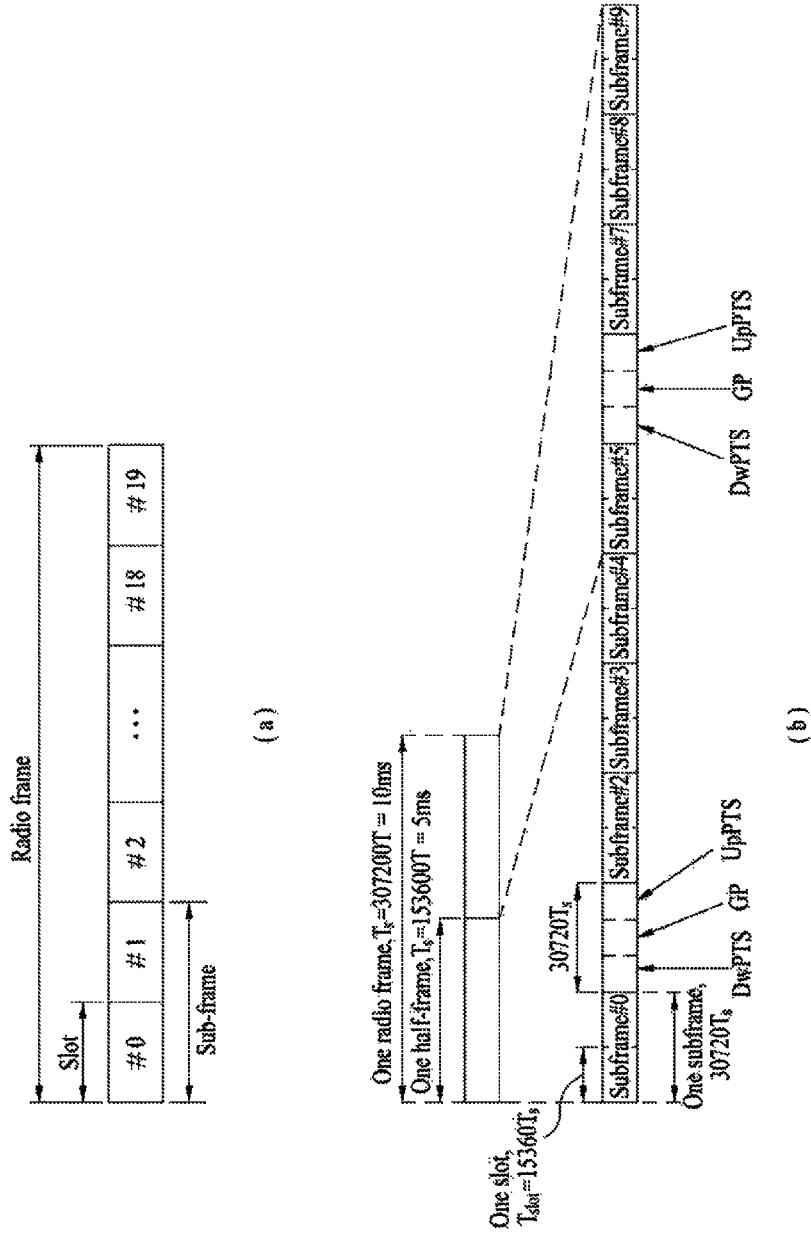
FIG. 1 is a diagram illustrating a structure of a radio frame.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention will be described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. At this time, the 'base station' (BS) may be replaced with terminologies such as a fixed station, Node B, eNode B (eNB), and an access point (AP). Also, a relay may be replaced with terminologies such as a relay node (RN) and a relay station (RS). Also, a 'terminal' may be replaced with terminologies such as a user equipment (UE), a mobile station (MS), a mobile subscriber station (MSS), and a subscriber station (SS).

Specific terminologies used in the following description are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). For clarification of the description, although the present invention will be described based on the 3GPP LTE/LTE-A, it is to be understood that technical spirits of the present invention are not limited to the 3GPP LTE/LTE-A.

3GPP LTE/LTE-A System to which the Present Invention May be Applied

A structure of a radio frame will be described with reference to FIG. 1.

In a cellular OFDM communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) is a resource allocation unit and may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization or channel estimation at the user equipment. The UpPTS is used for channel estimation at the base station and uplink transmission synchronization of the user equipment. Also, the guard period is to remove interference occurring in the uplink due to multipath delay of downlink signals between the uplink and the downlink. Meanwhile, one subframe includes two slots regardless of the type of the radio frame.

The structure of the radio frame is only exemplary, and various modifications may be made in the number of subframes included in the radio frame, the number of slots included in the subframe, or the number of symbols included in the slot.

Figure 2:
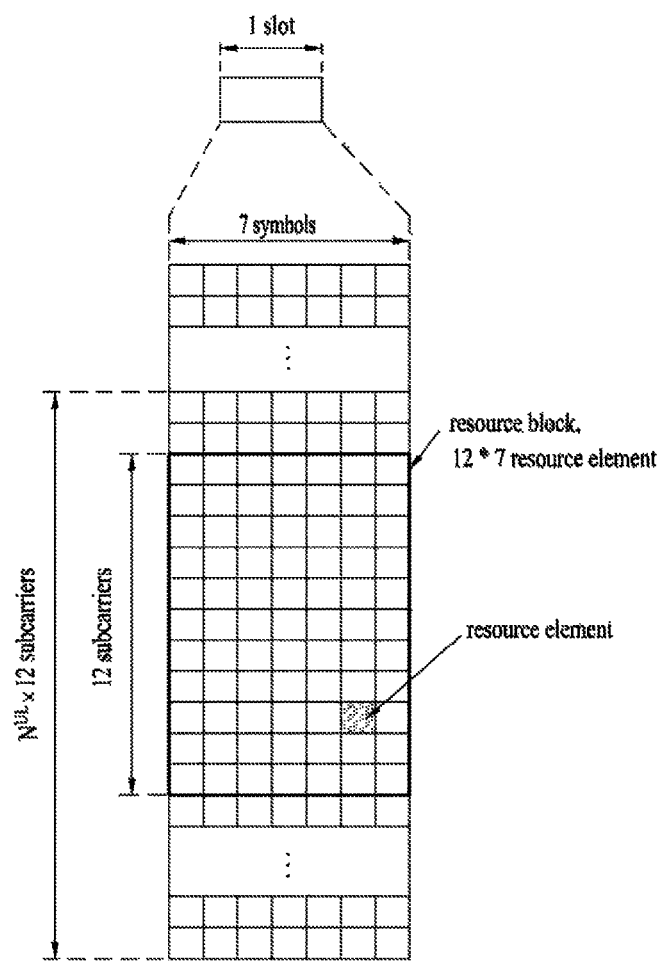
FIG. 2 is a diagram illustrating a resource grid at a downlink slot.

FIG. 2 is a diagram illustrating a resource grid at a downlink slot. One downlink slot includes, but not limited to, seven OFDM symbols in a time domain, and one resource block (RB) includes, but not limited to, twelve subcarriers in a frequency domain. For example, although one slot includes seven OFDM symbols in case of the normal CP, one slot may include six OFDM symbols in case of the extended CP. Each element on the resource grid will be referred to as a resource element (RE). One resource block (RB) includes 12×7(6) resource elements. The number $N^{DL}$ of resource blocks (RBs) included in the downlink slot depends on a downlink transmission bandwidth. A structure of an uplink slot may be the same as that of the downlink slot.

Figure 3:
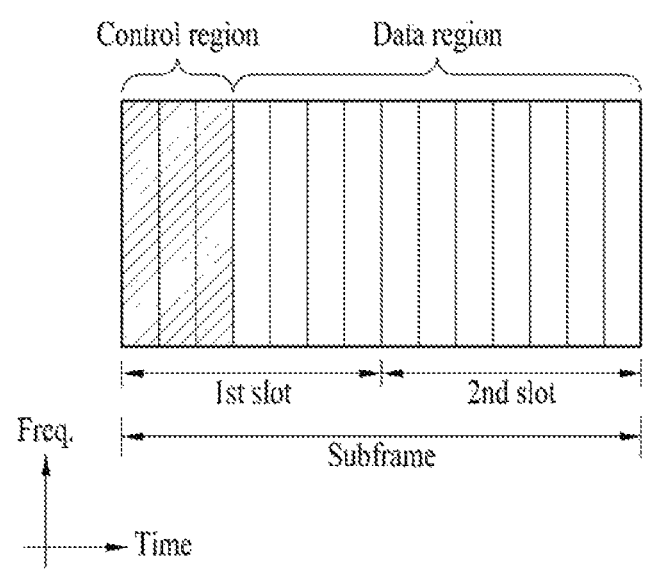
FIG. 3 is a diagram illustrating a structure of a downlink subframe.

FIG. 3 is a diagram illustrating a structure of a downlink subframe. Maximum three OFDM symbols located at the front of the first slot within the subframe correspond to a control region to which a control channel is allocated. The other OFDM symbols correspond to a data region to which a physical downlink shared channel (PDCCH) is allocated. Examples of the downlink control channel used in the 3GPP LTE system include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and includes information on the number of OFDM symbols used for transmission of the control channel within the subframe. The PHICH is a response to uplink transmission, and includes HARQ ACK/NACK (acknowledgement/negative-acknowledgement) signal. The control information transmitted through the PDCCH will be referred to as downlink control information (DCI). The DCI includes uplink or downlink scheduling information or uplink transmission (Tx) power control command for a random user equipment group. The PDCCH includes transport format and resource allocation information of a downlink shared channel (DL-SCH), resource allocation information of an uplink shared channel (UL-SCH), paging information of a paging channel (PCH), system information on the DL-SCH, resource allocation information of an upper layer control message such as a random access response transmitted onto the PDSCH, a set of transmission power control command of an individual user equipment within a random user equipment group, transmission power control information, and activation of voice over Internet protocol (VoIP). A plurality of PDCCHs may be transmitted within the control region. The user equipment may monitor the plurality of PDCCHs. The PDCCH is transmitted by aggregation of one or more continuous control channel elements (CCEs). The CCE is a logic allocation unit used to provide a PDCCH at a predetermined coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE. The base station determines a PDCCH format depending on the DCI transmitted to the user equipment, and attaches cyclic redundancy check (CRC) to the control information. The CRC is masked with a radio network temporary identifier (RNTI) depending on owner or usage of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). The CRC may be masked with a random access RNTI (RA-RNTI) to indicate a random access response that is a response to transmission of a random access preamble of the user equipment.

Figure 4:
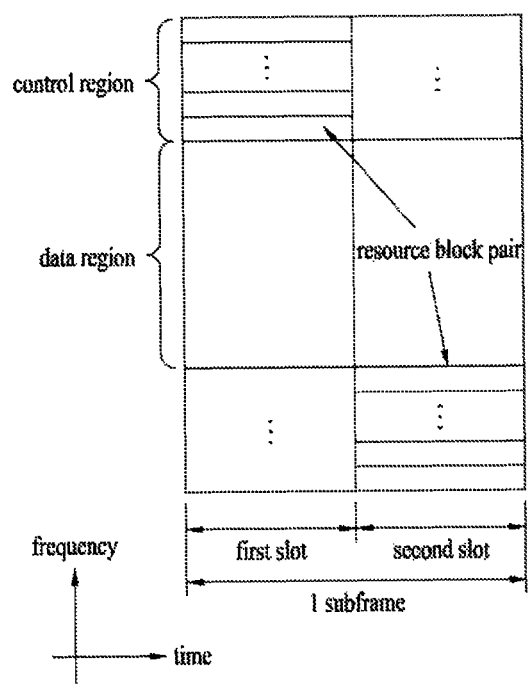
FIG. 4 is a diagram illustrating a structure of an uplink subframe.

FIG. 4 is a diagram illustrating a structure of an uplink subframe. The uplink subframe may be divided into a control region and a data region on a frequency domain. A physical uplink control channel (PUCCH) which includes uplink control information is allocated to the control region. A physical uplink shared channel (PUSCH) which includes user data is allocated to the data region. In order to maintain single carrier features, one user equipment does not transmit the PUCCH and the PUSCH at the same time. The PUCCH for one user equipment is allocated to resource block (RB) pair for the subframe. Resource blocks (RBs) belonging to the RB pair reserve different subcarriers for two slots. The RB pair allocated to the PUCCH is subjected to frequency hopping at a slot boundary.

Reference Signal (RS)

In the wireless communication system, since a packet is transmitted through a radio channel, signal distortion may occur during transmission of the packet. In order to normally receive the distorted signal in a receiving side, distortion of the received signal should be compensated using channel information. In order to discover the channel information, it is required to transmit the signal known by both a transmitting side and the receiving side and discover the channel information using a distortion level of the signal when the signal is transmitted through the channel. In this case, the signal known by both the transmitting side and the receiving side will be referred to as a pilot signal or a reference signal.

In case that multiple antennas are used to transmit and receive data, a channel status between each transmitting antenna and each receiving antenna should be known to receive a normal signal. Accordingly, a separate reference signal should exist per transmitting antenna, in more detail, per antenna port.

The reference signal may be divided into an uplink reference signal and a downlink reference signal. In the current LTE system, the uplink reference signal may include:
  i) a demodulation reference signal (DM-RS) for channel estimation for coherent demodulation of information transmitted through the PUSCH and the PUCCH; and
  ii) a sounding reference signal (SRS) for allowing a base station to measure uplink channel quality at frequencies of different networks.

Meanwhile, the downlink reference signal may include:
  i) a cell-specific reference signal (CRS) shared among all the user equipments within the cell;
  ii) a user equipment (UE)-specific reference signal for a specific user equipment only;
  iii) a demodulation reference signal (DM-RS) for coherent demodulation if the PDSCH is transmitted;
  iv) channel state information-reference signal (CSI-RS) for transferring channel state information (CSI) if a downlink DMRS is transmitted;
  v) a multimedia broadcast single frequency network (MBSFN) reference signal transmitted for coherent demodulation for a signal transmitted in an MBSFN mode; and
  vi) a positioning reference signal used to estimate geographic position information of the user equipment.

Figure 5:
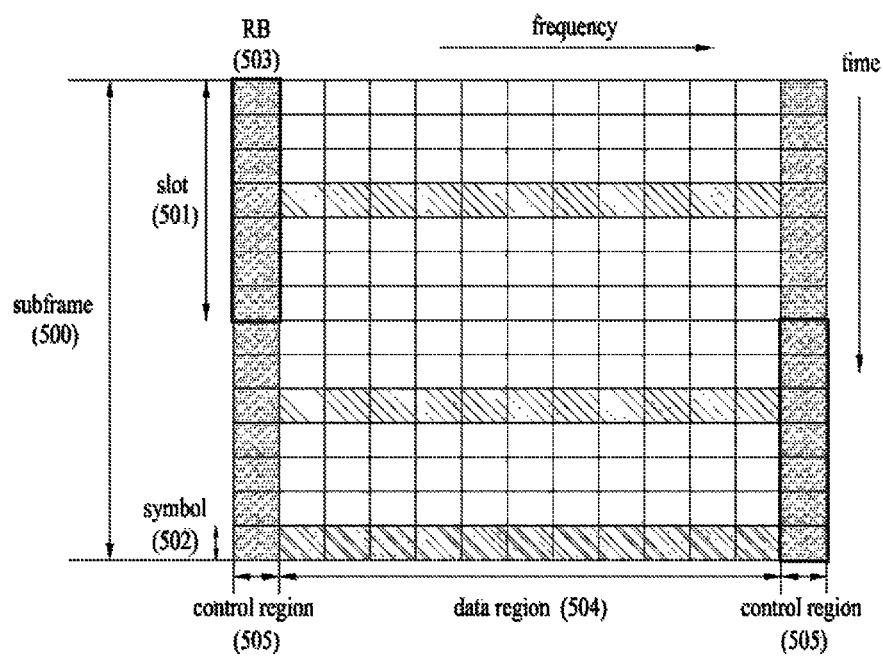
FIG. 5 is a diagram illustrating a sounding reference signal.
Figure 6:
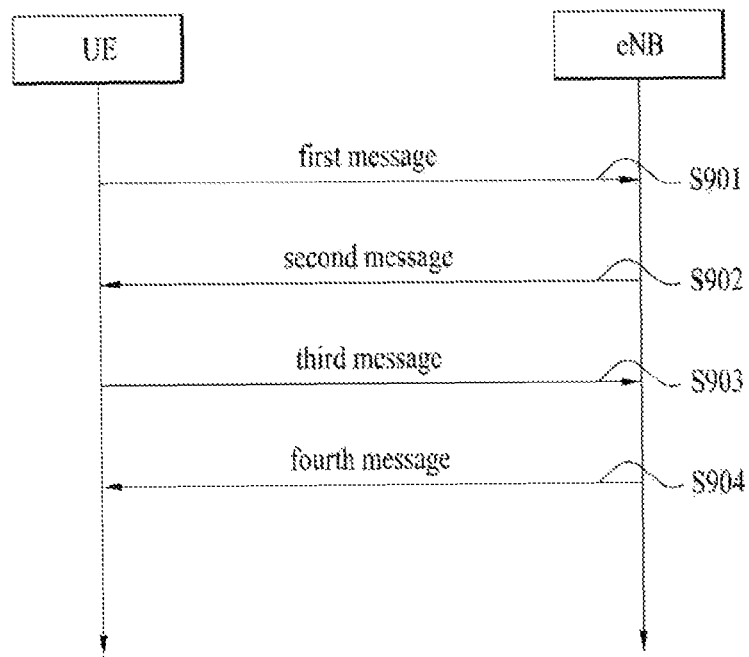
FIG. 6 is a diagram illustrating a random access procedure.

FIG. 5 is a diagram illustrating a sounding reference signal of an uplink reference signal of the aforementioned reference signal.

The sounding reference signal (SRS) is transmitted through the last SC-FDMA symbol located on a time axis at one subframe. The SRSs of several user equipments, which are transmitted to the last SC-FDMA symbol of the same subframe, may be identified from one another in accordance with frequency position/sequence.

The SRS is transmitted periodically. Configuration for periodic transmission of the SRS is configured by a cell-specific SRS parameter and a UE-specific SRS parameter. The cell-specific SRS parameter (in other words, cell-specific SRS configuration) and the UE-specific SRS parameter (in other words, UE-specific configuration) are transmitted to the user equipment through upper layer (for example, RRC) signaling.

The cell-specific SRS parameter includes srs-BandwidthConfig and srs-SubframeConfig. srs-BandwidthConfig indicates information on a frequency band to which the SRS may be transmitted, and srs-SubframeConfig indicates information on a subframe at which the SRS may be transmitted. The subframe at which the SRS may be transmitted within the cell is configured periodically within a frame. Table 1 illustrates srs-SubframeConfig of the cell-specific SRS parameter.

TABLE 1

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

$T_{SFC}$ indicates cell-specific subframe configuration, and $\Delta_{SFC}$ indicates cell-specific subframe offset. srs-SubframeConfig is provided by an upper layer.

The SRS is transmitted through a subframe that satisfies $\lfloor n_s/2 \rfloor \bmod T_{SFC} \in \Delta_{SFC}$. In this case, $n_s$ means a slot index.

The UE-specific SRS parameter includes srs-Bandwidth, srs-HoppingBandwidth, freqDomainPosition, srs-ConfigIndex, transmissionComb, and cyclicShift. srs-Bandwidth indicates a value used to configure a frequency band to which the SRS should be transmitted from the corresponding user equipment. srs-HoppingBandwidth indicates a value used to configure frequency hopping of the SRS. FreqDomainPosition indicates a value used to determine a frequency location to which the SRS is transmitted. srs-ConfigIndex indicates a value used to configure a subframe at which the SRS should be transmitted from the corresponding user equipment. transmissionComb indicates a value used to configure SRS transmission Comb. cyclicShift indicates a value used to configure a cyclic shift value applied to SRS sequence.

Tables 2 and 3 illustrate SRS transmission period and SRS subframe offset according to srs-ConfigIndex. The SRS transmission period indicates a time interval (unit, subframe or ms) of the SRS which should periodically be transmitted from the user equipment. Table 2 illustrates a case of FDD, and Table 3 illustrates a case of TDD. The SRS configuration index ($I_{SRS}$) is signaled per user equipment, and each user equipment identifies the SRS transmission period ($T_{SRS}$) and the SRS subframe offset ($T_{offset}$) by using the SRS configuration index ($I_{SRS}$).

TABLE 2

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}-2$ |
| 7-16 | 10 | $I_{SRS}-7$ |
| 17-36 | 20 | $I_{SRS}-17$ |
| 37-76 | 40 | $I_{SRS}-37$ |
| 77-156 | 80 | $I_{SRS}-77$ |
| 157-316 | 160 | $I_{SRS}-157$ |
| 317-636 | 320 | $I_{SRS}-317$ |
| 637-1023 | reserved | reserved |

TABLE 3

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 12 | 1, 4 |
| 7 | 2 | 2, 3 |
| 8 | 2 | 2, 4 |
| 9 | 2 | 3, 4 |
| 10-14 | 5 | $I_{SRS}-10$ |
| 15-24 | 10 | $I_{SRS}-15$ |
| 25-44 | 20 | $I_{SRS}-25$ |
| 45-84 | 40 | $I_{SRS}-45$ |
| 85-164 | 80 | $I_{SRS}-85$ |
| 165-324 | 160 | $I_{SRS}-165$ |
| 325-644 | 320 | $I_{SRS}-325$ |
| 645-1023 | reserved | reserved |

The cell-specific SRS parameter notifies the user equipment of a subframe reserved for SRS transmission within the cell, and the UE-specific SRS parameter notifies the user equipment of a subframe, at which the corresponding user equipment will actually transmit the SRS, among subframes corresponding to the cell-specific SRS parameters. The user equipment periodically transmits the SRS through a specific symbol (last symbol) of a subframe designated as the UE-specific SRS parameter. In more detail, the SRS is periodically transmitted at the subframe that satisfies Equation 1.

$(10 \cdot n_f + k_{SRS} - T_{offset,1}) \bmod T_{SRS,1} = 0$ (FDD case, TDD with $T_{SRS,1} > 2$)

$(k_{SRS} - T_{offset,1}) \bmod 5 = 0$ (TDD with $T_{SRS,1} = 2$)     [Equation 1]

In this case, $n_f$ indicates a frame index. $T_{SRS}$ indicates SRS transmission period, and $T_{offset}$ indicates (subframe) offset for SRS transmission. $k_{SRS}$ indicates a subframe index within the frame $n_f$. In case of FDD, $k_{SRS} = \{0, 1, \ldots, 9\}$, and in case of TDD, $k_{SRS}$ is as illustrated in Table 4.

TABLE 4

| | subframe index n | | | | | | | | |
|---|---|---|---|---|---|---|---|---|---|
| | | 1 | | | | 6 | | | |
| | 0 | 1st symbol of UpPTS | 2nd symbol of UpPTS | 2 3 4 5 | 1st symbol of UpPTS | 2nd symbol of UpPTS | 7 | 8 | 9 |
| $\kappa_{SRS}$ in case UpPTS length of 2 symbols | 0 | 1 | | 2 3 4 | 5 | 6 | 7 | 8 | 9 |
| $\kappa_{SRS}$ in case UpPTS length of 1 symbol | 1 | | | 2 3 4 | 6 | | 7 | 8 | 9 |

In the meantime, to protect SRS transmission at the subframe reserved through the cell-specific SRS parameter, the user equipment does not transmit an uplink signal through the last symbol of the subframe regardless of the fact that the SRS is actually transmitted at the corresponding subframe.

Random Access Procedure

In the LTE system, the user equipment may perform the random access procedure in case of the following events:

in the event that the user equipment performs initial access due to no connection (for example, RRC connection) with the base station;

in the event that the user equipment initially accesses a target cell during a handover procedure;

in the event that the random access procedure is requested by a command of the base station;

in the event that uplink data occur in a state that uplink time advance is not synchronized or a designated radio resource is not allocated; and in the event that a recovery process is performed during radio link failure (RLF) or handover failure.

Based on the above events, a general contention based random access procedure will be described as follows.

Figure 7:
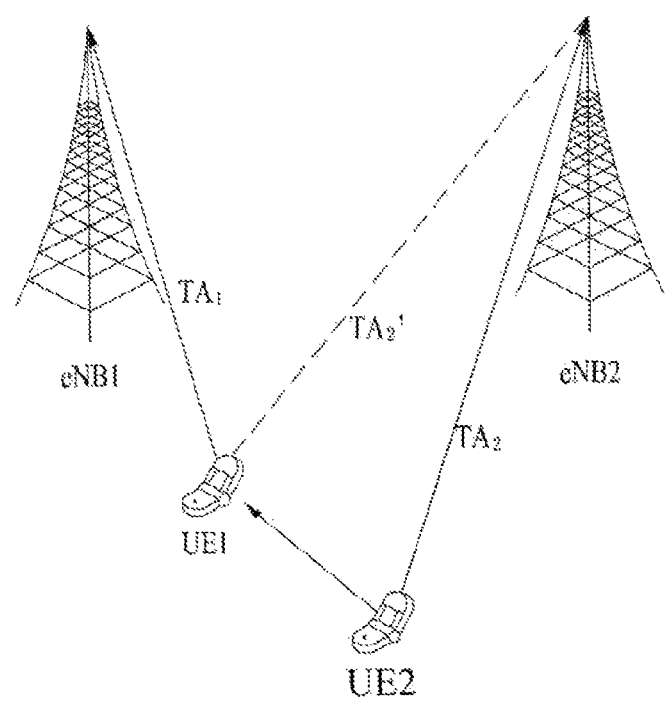
FIG. 7 is a diagram illustrating a network environment for describing the embodiment of the present invention.

FIG. 7 is a diagram illustrating an operation procedure of a user equipment and a base station in the contention based random access process.

(1) Transmission of First Message

First of all, the user equipment may randomly select one random access preamble from a set of random access preambles indicated through system information or handover command, and may select a physical random access channel (PRACH) resource, through which the random access preamble may be transmitted, and transmit the selected resource (S901).

(2) Reception of Second Message

After transmitting the random access preamble, the user equipment tries to receive its random access response within a random access receiving window indicated through the system information or handover command from the base station (S902). In more detail, the random access response information may be transmitted in the form of MAC PDU (packet data unit). The MAC PDU may be transferred through a physical downlink shared channel (PDSCH). Also, in order to appropriately receive the information transferred through the PDSCH, it is preferable that the user equipment monitors a physical downlink control channel (PDCCH). In other words, it is preferable that the PDCCH includes information of the user equipment, which should receive the PDSCH, frequency and time information of a radio resource of the PDSCH, and a transmission format of the PDSCH. Once the user equipment receives the PDCCH successfully, the user equipment may appropriately receive the random access response transmitted through the PDSCH in accordance with the information of the PDCCH. The random access response may include a random access preamble identifier (ID; for example, RAPID (random access preamble identifier)), uplink (UL) grant indicating uplink radio resources, a temporary cell identifier (temporary C-RNTI (Cell-Radio Network Temporary Identifier)), and time advance commands (TACs).

As described above, since random access response information for one or more user equipments may be included in one random access response, the random access preamble identifier is required for random access response to indicate a user equipment for which the UL grant, the temporary cell identifier and the TAC are valid. In this case, it is assumed that the user equipment selects a random access preamble identifier identical with the random access preamble selected by itself at the step S902.

(3) Transmission of Third Message

If the user equipment receives a random access response valid for itself, the user equipment processes each of various kinds of the information included in the random access response. In other words, the user equipment applies TAC and stores a temporary cell identifier. Also, the user equipment may store data, which will be transmitted in response to reception of the valid random access response, in a buffer for message 3.

In the meantime, the user equipment transmits data (that is, third message) to the base station by using the received UL grant (S903). The third message should include the identifier of the user equipment. In case of the content based random access procedure, the base station cannot determine user equipments that perform the random access procedure. This is because that the base station should identify the user equipment to resolve contention later.

Two methods of including the identifier of the user equipment in the third message have been discussed. The first method is that the user equipment having a valid cell identifier allocated from a corresponding cell before the random access procedure transmits its cell identifier through an uplink transmission signal corresponding to the UL grant. On the other hand, the user equipment which is not allocated with a valid cell identifier before the random access procedure transmits its unique identifier (for example, S-TMSI (S-Temporary Mobile Subscriber Identity) or random ID). Generally, the unique identifier is longer than the cell identifier. The user equipment which has transmitted the data corresponding to the UL grant initiates a contention resolution timer (hereinafter, referred to as "CR timer").

(4) Reception of Fourth Message

After the user equipment transmits the data including its identifier to the base station through the UL grant included in the random access response, the user equipment waits for a command of the base station to resolve contention. In other words, the user equipment tries to receive the PDCCH to receive a specific message (S904). Two methods of receiving the PDCCH have been discussed. As described above, if the third message transmitted to correspond to the UL grant is transmitted using the cell identifier, the user equipment may try to receive the PDCCH by using its cell identifier. If the identifier of the user equipment is the unique identifier, the user equipment may try to receive the PDCCH by using the temporary cell identifier included in the random access response. Afterwards, in case of the former case, if the PDCCH is received through the cell identifier of the user equipment before the CR timer expires, the user equipment determines that the random access procedure has been performed normally, and ends the random access procedure. In case of the latter case, if the PDCCH is received through the temporary cell identifier before the CR timer expires, the user equipment identifies the data carried by the PDSCH indicated by the PDCCH. If the unique identifier of the user equipment is included in the data carried by the PDSCH, the user equipment determines that the random access procedure has been performed normally, and ends the random access procedure.

Meanwhile, unlike the aforementioned contention based random access procedure shown in FIG. 7, in a non-contention based random access procedure, the random access procedure ends by means of only transmission of the first message and the second message. However, before the user equipment transmits the random access preamble to the base station as the first message, the user equipment is allocated with the random access preamble from the base station, and transmits the allocated random access preamble to the base station as the first message and receives the random access response from the base station, whereby the random access procedure ends.

D2D Communication Between User Equipments which Belong to Different Cells

Hereinafter, based on the aforementioned description, a method for transmitting and receiving a signal for D2D communication between user equipments will be described. In particular, the method relates to a case where user equipments which will perform D2D communication are associated with different cells (which may be different base stations/transmission points or different frequency bands). In other words, the method relates to a discovery method for performing D2D communication between inter-cell D2D user equipments. In this case, discovery may mean initial timing acquisition, received power measurement and/or D2D signal measurement.

FIG. 7 is a diagram illustrating a communication environment to which the present invention may be applied. Referring to FIG. 7, a first user equipment and a second user equipment may perform D2D communication, and respectively have a first transmission point and a second transmission point as a serving cell. Also, D2D communication between the first user equipment and the second user equipment may be performed using uplink resources of a cellular network. If D2D user equipments perform D2D communication by using downlink resources, it is effective in that interference, which affects neighboring user equipments of the user equipments that perform D2D communication, may be reduced. Accordingly, it is hereinafter assumed that uplink resources of the D2D user equipments are used for signal transmission and reception (discovery signal transmission and reception, data transmission and reception, etc.) for D2D communication of the D2D user equipments.

Under the circumstances, the first user equipment should a discovery procedure to perform D2D communication with the second user equipment. In this case, a problem occurs in that time advances of the first user equipment and the second user equipment may not be synchronized with each other as the first user equipment and the second user equipment belong to their respective cells different from each other. In more detail, each of the first user equipment and the second user equipment knows only timing information (for example, downlink signal receiving timing that may be known through PSS/SSS in case of the LTE/LTE-A and timing advance (value) for uplink transmission, which is acquired by the random access procedure) on its serving cell. In other words, although D2D signal (discovery signal, data, etc.) transmitted from the second user equipment depends on a timing advance $TA_2$ received from the second transmission point, the first user equipment cannot know the timing advance $TA_2$ of the second user equipment, whereby the first user equipment cannot receive the D2D signal of the second user equipment normally.

Accordingly, in the embodiment of the present invention, methods for enabling the first user equipment to effectively acquire a timing advance of the second user equipment will be described hereinafter. Although the following description will be described based on the LTE/LTE-A system for convenience, the following description may be applied to another type radio network. Also, it is assumed that the following description is based on the environment of FIG. 7 and each user equipment is synchronized with the transmission point which is a serving cell. In the environment of FIG. 7, the first transmission point and the second transmission point which are serving cells of the user equipments which desire to perform D2D communication may be operated in a state that they are synchronized with each other or not. Even though the transmission points are not operated in a state that they are synchronized with each other, they may share a common timing clock (for example, common clock through GPS). Accordingly, a method for enabling the first user equipment to acquire a timing advance of the second user equipment will be described hereinafter for each case.

Embodiment 1-1

The embodiment 1-1 assumes that transmission points of each of the user equipments, which desire to perform D2D communication, share timing offset of subframe boundary through the aforementioned common clock (global timing) or timing tracking between the transmission points even though they do not perform downlink transmission in a state that they are synchronized with each other. In this case, five embodiments will be described as follows.

Embodiment 1-1-1

The embodiment 1-1-1 relates to sharing of downlink transmission timing (DL TX timing) between the transmission points. In more detail, the first transmission point and the second transmission point mutually share downlink transmission timing, and the first transmission point may forward information related to transmission timing of the second transmission point to the first user equipment. However, the information related to the transmission timing of the second transmission point may be estimated by the first user equipment.

Figure 8:
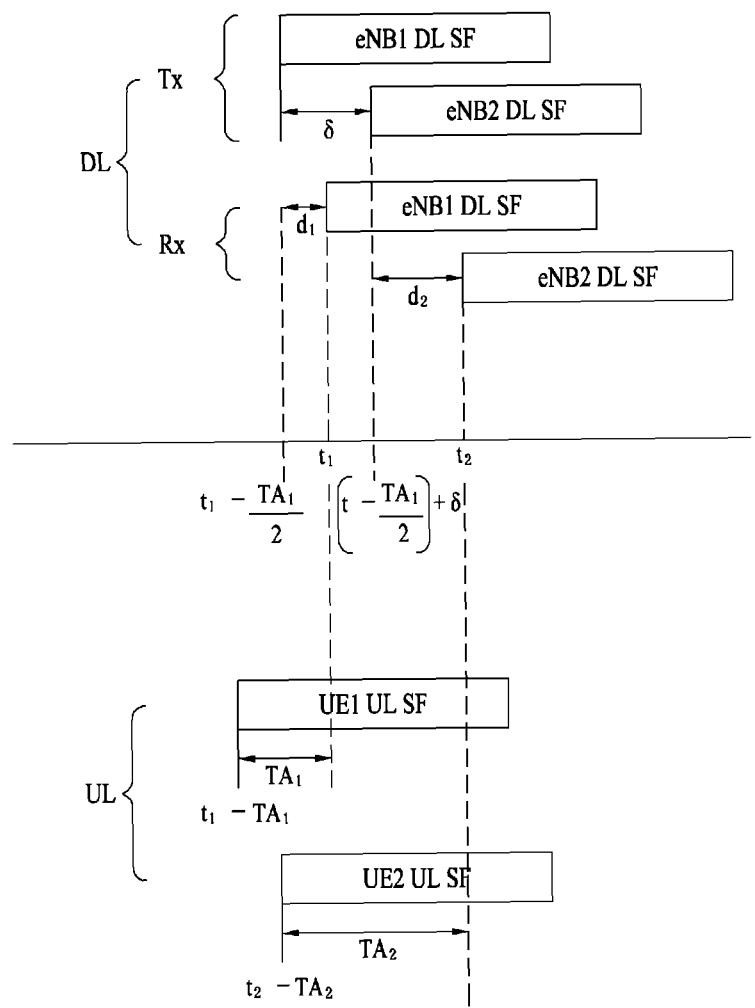
FIGS. 8 and 9 are diagrams illustrating a method for acquiring synchronization according to the embodiment of the present invention.

FIG. 8 illustrates a procedure of acquiring a timing advance $TA_2$ of the second user equipment on the basis of the information related to the transmission timing of the second transmission point.

Referring to FIG. 8, the first user equipment receives the information related to the transmission timing of the second transmission point from the first transmission point. In this case, the information related to the transmission timing of the second transmission point may be a difference value $\delta$ between downlink transmission timing of the first transmission point and downlink transmission timing of the second transmission point. To this end, the first transmission point may receive the downlink transmission timing of the second transmission point or δ from the second transmission point through a backhaul link.

The first user equipment may calculate the timing advance $TA_2$ of the second user equipment by using the information δ related to the downlink transmission timing of the second transmission point, downlink transmission timing $$t_1 - \frac{TA_1}{2}$$

of the first transmission point and downlink signal reception timing $t_2$ from the second transmission point.

In more detail, the first user equipment calculates the downlink transmission timing $$t_1 - \frac{TA_1}{2}$$

of the first transmission point from the downlink signal reception timing $t_1$ from the first transmission point and its timing advance $TA_1$.

The first user equipment calculates downlink transmission timing $$\left(t_1 - \frac{TA_1}{2}\right) + \delta$$

of the second transmission point from the downlink transmission timing $$t_1 - \frac{TA_1}{2}$$

of the first transmission point and the information δ related to the downlink transmission timing of the second transmission point. In other words, as shown, if the information δ related to the downlink transmission timing of the second transmission point is added to the downlink transmission timing $$t_1 - \frac{TA_1}{2}$$

of the first transmission point, the downlink transmission timing $$\left(t_1 - \frac{TA_1}{2}\right) + \delta$$

of the second transmission point may be obtained.

The first user equipment may know the downlink signal reception timing $t_2$ of the second transmission point by receiving the synchronization signal (PSS/SSS) of the second transmission point, wherein propagation delay $d_2$ may be obtained from the difference between the downlink transmission timing $$\left(t_1 - \frac{TA_1}{2}\right) + \delta$$

of the second transmission point and the downlink signal reception timing $t_2$ of the second transmission point. Since the timing advance of the second user equipment is two times of the propagation delay $d_2$, the first user equipment may obtain the timing advance $$2\left(t_2 - \left(\left(t_1 - \frac{TA_1}{2}\right) + \delta\right)\right)$$

of the second user equipment. In other words, the timing advance $$2\left(t_2 - \left(\left(t_1 - \frac{TA_1}{2}\right) + \delta\right)\right)$$

of the second user equipment may be obtained from the downlink signal reception timing $t_2$ of the second transmission point and the downlink transmission timing $$\left(t_1 - \frac{TA_1}{2}\right) + \delta$$

of the second transmission point.

In conclusion, the first user equipment may obtain the timing advance of the second user equipment by using the following Equation 2.

$$TA_2 = 2\left(t_2 - \left(\left(t_1 - \frac{TA_1}{2}\right) + \delta\right)\right) \quad \text{[Equation 2]}$$

In the above Equation 2, $TA_2$ means the timing advance of the second user equipment, $t_1$ means the downlink signal reception timing from the first transmission point, $t_2$ means the downlink signal reception timing from the second transmission point, $TA_1$ means the timing advance of the first user equipment, and δ means the information related to the transmission timing of the second transmission point. The first user equipment that has known the timing advance of the second user equipment may receive a signal related to D2D, which is transmitted from the second user equipment through the uplink.

Embodiment 1-1-2

In the embodiment 1-1-2, the base station/transmission point estimates timing advance for the second transmission point of the first user equipment by overhearing an uplink reference signal. In this case, the reference signal may be an SRS, a DMRS or a separate reference signal for D2D.

In more detail, referring to FIG. 7, the first transmission point notifies the second transmission point of information (for example, in case of SRS, SRS frequency band, group number, base sequence number, etc.) related to reference sequence of the first user equipment, IE of the first user equipment, and uplink transmission timing of the first user equipment, or information (for example, uplink subframe reception timing $TA_1$ of the first transmission point) that may predict the uplink transmission timing of the first user equipment, through an interface X2. The second transmission point that has received the above information may receive the uplink reference signal transmitted from the first user equipment. The second transmission point may obtain $TA_2'$ by receiving/overhearing the uplink reference signal of the first user equipment and predicting propagation delay from the first user equipment. Afterwards, the second transmission point may notify the first transmission point of $TA_2'$ (or information corresponding to $TA_2'$), and the first transmission point may forward $TA_2'$ (or information corresponding to $TA_2'$) to the first user equipment through upper layer signaling.

Embodiment 1-1-3

Unlike the embodiment 1-1-2, timing advance for the second transmission point of the first user equipment may be estimated by overhearing RACH signal. This considers that detection may be difficult in case of great cell coverage when an uplink reference signal is overheard.

The second transmission point may receive PRACH related information (for example, sequence format, sequence number, resource configuration, etc.) of the first user equipment, ID of the first user equipment, and uplink subframe transmission information from the first transmission point through a backhaul link to overhear the RACH signal of the first user equipment.

Afterwards, the first transmission point may request the first user equipment to transmit PRACH preamble. At this time, initial power of PRACH preamble transmission of the first user equipment may be boosted if necessary. This power boost request may be performed as the second transmission point requests the first transmission point of it.

The second transmission point may estimate the timing advance $TA_2'$ for the second transmission point of the first user equipment by receiving the PRACH preamble transmitted from the first user equipment and then forward the estimated timing advance $TA_2'$ to the first transmission point through a backhaul link. The first transmission point may forward the timing advance $TA_2'$ for the second transmission point of the first user equipment to the first user equipment through upper layer signaling.

Embodiment 1-1-4

In case of the embodiment 1-1-3, the first transmission point and the second transmission point are temporarily synchronized with each other. If inter-cell D2D communication occurs frequently in an asynchronous system, a process for discovery may be generated repeatedly. Accordingly, the respective transmission points may monitor inter-cell D2D occurrence frequency, whereby downlink transmission synchronization may temporarily be synchronized by the transmission points having high frequency, and the synchronized downlink transmission may be notified to the user equipment. In this case, the first user equipment may know the timing advance $TA_2$ of the second user equipment in accordance with the embodiments 2-1 and 2-2 of a synchronized cellular network which will be described later.

Embodiment 1-1-5

The second transmission point may directly notify the first user equipment of timing information of the second user equipment. In more detail, the second transmission point may forward ID of the second user equipment, $TA_2$, and downlink subframe transmission timing (or as information corresponding to downlink subframe transmission timing, timing offset between transmission points) of the second transmission point to the first transmission point through a backhaul link. The first transmission point that has received the ID of the second user equipment, $TA_2$, and downlink subframe transmission timing (or as information corresponding to downlink subframe transmission timing, timing offset between transmission points) of the second transmission point may forward a difference value δ between the downlink transmission timing of the first transmission point and the downlink transmission timing of the second transmission point and $TA_2$ to the first user equipment through upper layer signaling.

Embodiment 1-2

The embodiment 1-2 is intended for a case where there is no common timing information between the transmission points unlike the embodiment 1-1. In this case, the first user equipment may perform inter-cell D2D by performing handover to the second transmission point, it is not effective. Accordingly, a method for enabling the first user equipment to overhear an uplink reference signal of the second user equipment may be considered.

In more detail, the first user equipment may overhear the uplink reference signal of the second user equipment. As a result, the first user equipment may determine/estimate subframe boundary of the second user equipment from the uplink reference signal of the second user equipment, and may receive a signal for D2D, which is transmitted from the second user equipment, by using the determined/estimated result.

In order that the first user equipment overhears the uplink reference signal of the second user equipment, the second transmission point needs to forward configurations/matters (for example, in case of SRS, SRS frequency band, group number, base sequence number, etc.) related to the uplink reference signal of the second user equipment.

Also, reference signal overhearing of the second user equipment through the first user equipment may be performed for a predetermined time interval. In this case, information on the predetermined time interval is required to be forwarded to the first transmission point. In case of the LTE system, the first transmission point may be informed that uplink transmission is not performed for a certain interval, by using DRX mode.

If the first user equipment overhears the uplink reference signal of the second user equipment, information as to how many subframes should be overheard may be determined previously, or may be changed adaptively. In more detail, if the overhearing subframe is determined previously, the first transmission point may forward the overhearing subframe to the first user equipment through upper layer signaling. If a subframe of an adaptive length is overheard, the first user equipment may determine a certain threshold value and perform overhearing to reach the threshold value. In this case, the threshold value may be notified from the first transmission point through upper layer signaling or may be variable in accordance with a peripheral condition of the first user equipment.

Figure 9:
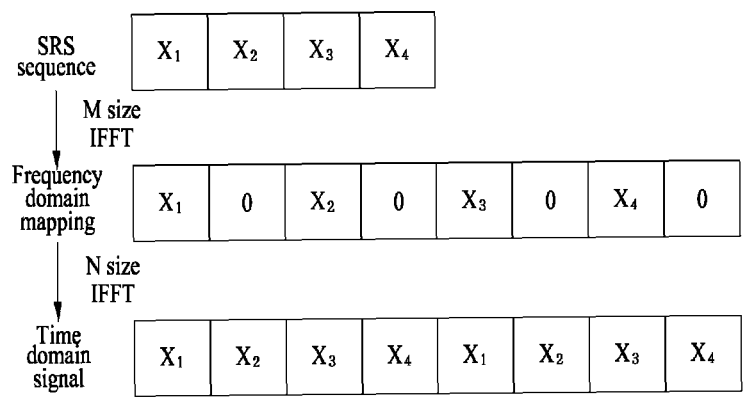

The reference signal for overhearing may be the SRS. This is because that the first user equipment may easily determine subframe boundary as the SRS is transmitted in the form of IFDMA (Interleaved FDMA) of which repetition factor is 2. In other words, as shown in FIG. 9, SRS sequence is generated in the time domain repeatedly two times, and in this case, may assist the first user equipment in detecting the SRS.

If the distance between the user equipments which perform D2D communication is long, overhearing of the PRACH signal instead of the SRS may be used.

The aforementioned embodiments relate to the case where the transmission points to which the user equipments for performing D2D communication belong are not synchronized with each other. In case of the cellular system where the base stations are synchronized each other, since downlink transmission timings between the transmission points are coincident with each other, the user equipment may estimate propagation delay from each transmission point by detecting synchronization signals (synchronization preambles, reference signals, etc.) from both the transmission points. Hereinafter, related embodiments will be described.

Embodiment 2-1

The first user equipment may discover the timing advance $TA_2$ of the second user equipment by directly measuring propagation delay. In more detail, referring to FIG. 7 again, the first user equipment may estimate propagation delay from each transmission point by detecting signal reception timings from the first transmission point and the second transmission point and subtracting difference between the signal reception timing and signal transmission timing. In order to measure propagation delay, downlink subframe transmission boundary is required to be indicated to the first user equipment. If the first user equipment does not have a common clock with the transmission point, downlink transmission timing may be notified to the first user equipment through upper layer signaling.

The first user equipment may obtain the timing advance of the second user equipment in accordance with the following Equation 3. As will be aware of it from the Equation 3, the first user equipment may obtain $TA_2'$ and regard $TA_2'$ as $TA_2$ considering that the distance between the user equipments which perform D2D communication is generally short.

$$TA_2 \approx TA_2' = 2d_2 = TA_1 - 2(d_1 - d_2) \qquad \text{[Equation 3]}$$

In the above Equation 3, $TA_1$ means the timing advance of the first user equipment, $TA_2$ means the timing advance of the second user equipment, $d_1$ means propagation delay from the first transmission point, and $d_2$ means propagation delay from the second transmission point.

Embodiment 2-2

Unlike the embodiment 2-1, the timing advance of the second user equipment or information corresponding to the timing advance of the second user equipment may directly be notified from the transmission point.

In other words, the second transmission point may forward the timing advance of the second user equipment or information (for example, propagation delay estimated by the second transmission point from the first user equipment or $TA_2'$ estimated approximately from cell coverage) corresponding to the timing advance of the second user equipment to the first transmission point. In this case, D2D communication of several user equipments occurs, ID of the second user equipment may be forwarded to the first transmission point together with the timing advance and the information.

The first transmission point may notify the first user equipment of ID of the second user equipment and/or $TA_2$ (or offset between TAs).

Although the aforementioned description has been made based on inter-cell D2D communication (same band), the aforementioned description may be applied to inter-band D2D operation. Inter-band D2D may be divided into intra-cell inter-band D2D communication and inter-cell inter-band D2D communication. Intra-cell inter-band D2D communication means that each of D2D UEs performs communication with one transmission point at different frequencies between the D2D UEs. Inter-cell inter-band D2D communication means that each UE performs communication through different bands at different base stations. Since communication is performed through different bands, subframe boundary may be varied between the user equipments in spite of the same base station. For example, 1, 1-1 to 1-5 and 2-1 of the aforementioned embodiments may be applied to the intra-cell inter-band D2D communication. This is because that the transmission point may know downlink subframe boundary for each band in case of intra-cell inter-band. In the inter-cell inter-band D2D communication, the case where downlink subframe boundary may be shared and the case where downlink subframe boundary cannot be shared may be selected appropriately from the aforementioned embodiments.

Figure 10:
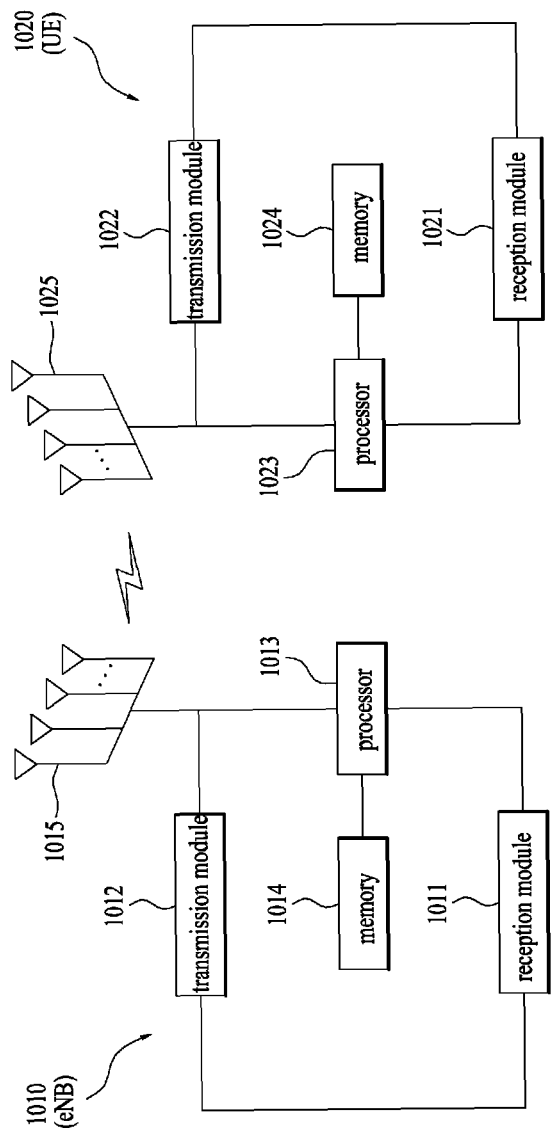
FIG. 10 is a diagram illustrating a configuration of a transceiving apparatus.

FIG. 10 is a diagram illustrating a configuration of a base station and a user equipment according to the embodiment of the present invention.

Referring to FIG. 10, the base station 1010 according to the present invention may include a reception module 1011, a transmission module 1012, a processor 1013, a memory 1014, and a plurality of antennas 1015. The plurality of antennas 1015 mean the base station that supports MIMO transmission and reception. The reception module 1011 may receive various kinds of signals, data and information on an uplink from the user equipment. The transmission module 1012 may transmit various kinds of signal, data and information on a downlink to the user equipment. The processor 1013 may control the overall operation of the base station 1010.

The processor 1013 of the base station 1010 according to one embodiment of the present invention may process requirements in the aforementioned embodiments.

In addition, the processor 1013 of the base station 1010 performs an operation for information received by the base station 1010, information to be transmitted to the outside, etc., and the memory 1014 may store the operation processed information for a predetermined time and may be replaced with an element such as a buffer (not shown).

Subsequently, referring to FIG. 10, the user equipment 1020 of the present invention may include a reception module 1021, a transmission module 1022, a processor 1023, a memory 1024, and a plurality of antennas 1025. The plurality of antennas 1025 mean the user equipment that supports MIMO transmission and reception. The reception module 1021 may receive various kinds of signals, data and information on a downlink from the base station. The transmission module 1022 may transmit various kinds of signal, data and information on an uplink to the base station. The processor 1023 may control the overall operation of the user equipment 1020.

The processor 1023 of the user equipment 1020 according to one embodiment of the present invention may process requirements in the aforementioned embodiments.

In addition, the processor 1023 of the user equipment 1020 performs an operation for information received by the user equipment 1020, information to be transmitted to the outside, etc., and the memory 1024 may store the operation processed information for a predetermined time and may be replaced with an element such as a buffer (not shown).

The details of the aforementioned base station and the aforementioned user equipment may be configured in such a manner that the aforementioned various embodiments of the present invention may independently be applied to the aforementioned base station and the aforementioned user equipment, or two or more embodiments may simultaneously be applied to the aforementioned base station and the aforementioned user equipment, and repeated description will be omitted for clarification.

Also, in the description of FIG. 10, the description of the base station 1010 may equally be applied to a relay station as a downlink transmission entity or an uplink reception entity, and the description of the user equipment 1020 may equally be applied to a relay station as a downlink reception entity or an uplink transmission entity.

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention may be applied to various wireless communication systems.

The invention claimed is:

1. A method for acquiring synchronization for the device-to-device (D2D) communication of a first user equipment in a wireless communication system, the method comprising:
calculating a time advance of a second user equipment by using a downlink transmission timing of a first transmission point, a difference value between the downlink transmission timing of the first transmission point and a downlink transmission timing of a second transmission point, a downlink signal reception timing from the first transmission point based on the downlink transmission timing of the first transmission point, a downlink signal reception timing from the second transmission point based on the downlink transmission timing of the first transmission point and a time advance of the first user equipment, under assumption that the time advance of the first user equipment for the second transmission point is equivalent to the time advance of the second user equipment; and
receiving a signal from the second user equipment by using the time advance of the second user equipment.

2. The method according to claim 1, wherein at least one of the downlink transmission timing of the first transmission point, the difference value between the downlink transmission timing of the first transmission point and the downlink transmission timing of the second transmission point, the downlink signal reception timing from the first transmission point based on the downlink transmission timing of the first transmission point, the downlink signal reception timing from the second transmission point based on the downlink transmission timing of the first transmission point and the time advance of the first user equipment is transmitted from the first transmission point.

3. The method according to claim 1, wherein the timing advance of the second user equipment is expressed by the following Equation:

$$TA_2 = 2\left(t_2 - \left(\left(t_1 - \frac{TA_1}{2}\right) + \delta\right)\right),$$

where $TA_2$ is the timing advance of the second user equipment, $t_1$ is the downlink signal reception timing from the first transmission point, $t_2$ is the downlink signal reception timing from the second transmission point, $TA_1$ is the timing advance of the first user equipment, and $\delta$ is the information related to the transmission timing of the second transmission point.

4. The method according to claim 1, further comprising:
receiving the difference value between the downlink transmission timing of the first transmission point and the downlink transmission timing of the second transmission point from the first transmission point.

5. The method according to claim 1, wherein the difference value between the downlink transmission timing of the first transmission point and the downlink transmission timing of the second transmission point is a value estimated by the user equipment.

6. The method according to claim 1, wherein the downlink signal reception timing from the first transmission point and the downlink signal reception timing from the second transmission point are respectively determined from synchronization signals from the first transmission point and the second transmission point.

* * * * *